United States Patent [19]
Murphy

[11] Patent Number: 5,727,421
[45] Date of Patent: Mar. 17, 1998

[54] APPARATUS AND METHOD FOR PROVIDING LEAK PROOF SEALING BETWEEN A METAL ROD AND A PLASTIC HOUSING MOLDED THERE AROUND

[75] Inventor: George W. Murphy, Elk River, Minn.

[73] Assignee: IMI Cornelius Inc., Anoka, Minn.

[21] Appl. No.: 386,566

[22] Filed: Feb. 10, 1995

[51] Int. Cl.$^6$ .................. G01F 23/00; H01H 29/00; H01R 4/48; H01R 13/52
[52] U.S. Cl. .................. 73/304 R; 73/866.5; 200/190; 340/620; 439/913; 439/271
[58] Field of Search .................. 439/271, 433, 439/434, 913; 200/190; 340/620; 73/304 R, 866.5

[56] References Cited

U.S. PATENT DOCUMENTS

| | | | |
|---|---|---|---|
| 2,470,066 | 5/1949 | Calabrese | 439/271 |
| 2,836,808 | 5/1958 | Walker | 340/620 |
| 3,922,477 | 11/1975 | Glowacz | 439/271 |
| 3,964,934 | 6/1976 | Ching, Jr. et al. | 136/135 R |
| 4,117,720 | 10/1978 | Simonsen et al. | 73/194 EM |
| 4,519,662 | 5/1985 | Riley et al. | 439/271 |
| 4,632,482 | 12/1986 | Punako et al. | 439/271 |
| 4,879,902 | 11/1989 | Loniello | 73/304 R X |
| 5,104,253 | 4/1992 | Zielinski et al. | 439/271 |
| 5,272,921 | 12/1993 | Föller et al. | 73/304 R |

*Primary Examiner*—William A. Cuchlinski, Jr.
*Assistant Examiner*—Willie Morris Worth
*Attorney, Agent, or Firm*—Sten Erik Hakanson

[57] ABSTRACT

An apparatus and method for providing liquid and gas proof sealing between a metal rod and a plastic housing molded there around. The rod includes a plurality of annular intrusions or protrusions along a length thereof. The plastic material is formed around the rod and the annular intrusions or protrusions. After the plastic material has cooled the rod is translated linearly with respect thereto whereby the annular intrusions or protrusions cause a cold flow movement or disruption of the plastic material. This movement results in a liquid and gas tight sealing between the rod and the plastic housing. The invention herein has particular application for liquid level sensing probes located within gas pressurized vessels. In such examples the rod or rods are used for sensing liquid level by means of electrical conductivity with the sensed liquid. The sealing between the rod and plastic housing prevents the contained pressurized liquid and gas from escaping the vessel by flowing between the sensing rod or rods and their respective plastic housing.

11 Claims, 3 Drawing Sheets

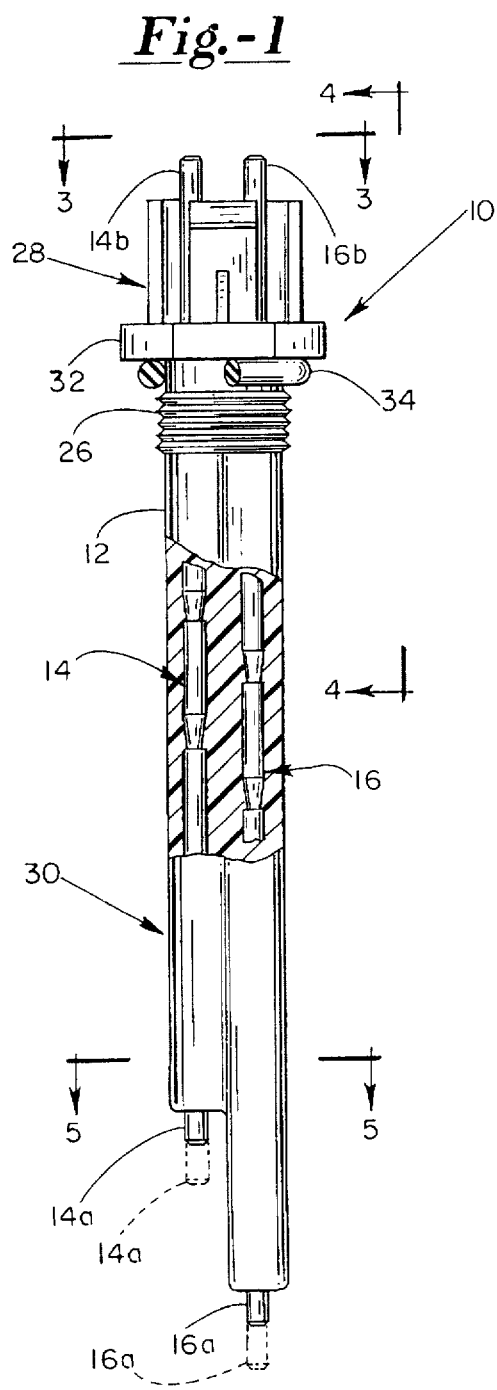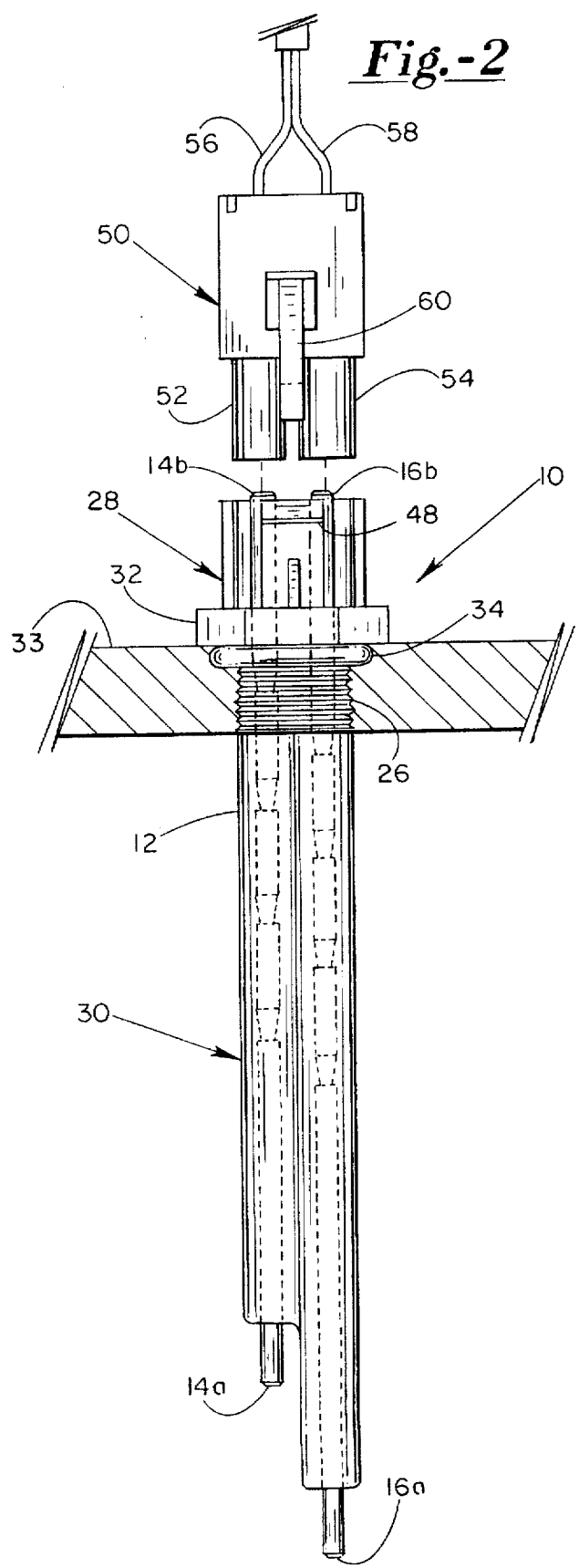

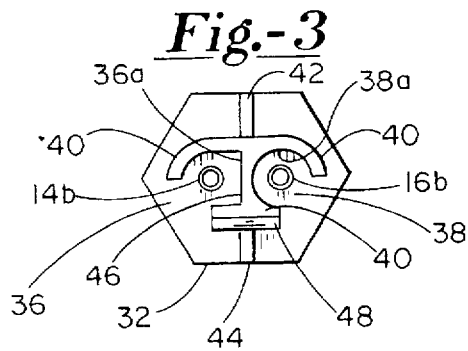
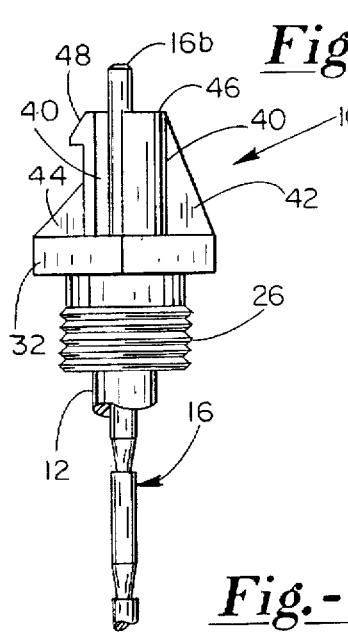
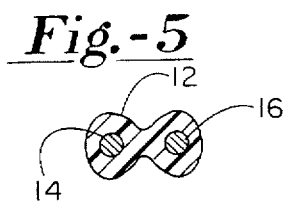
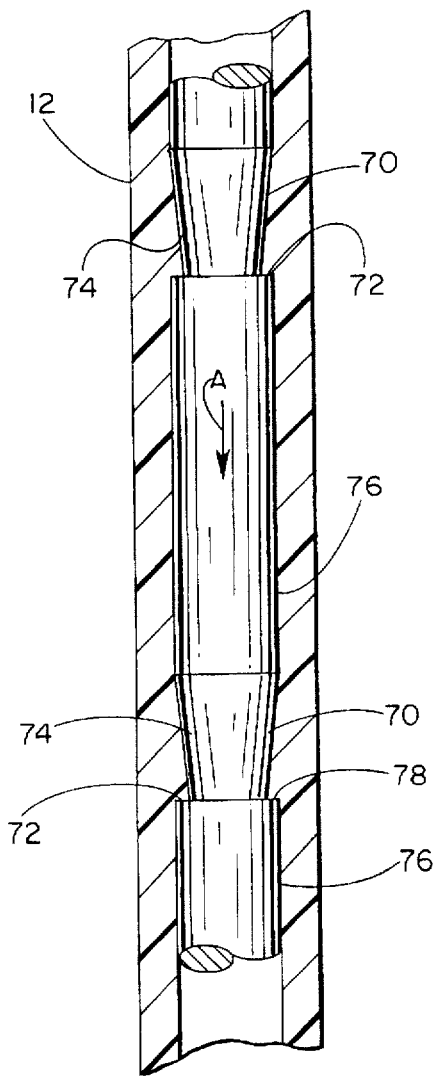
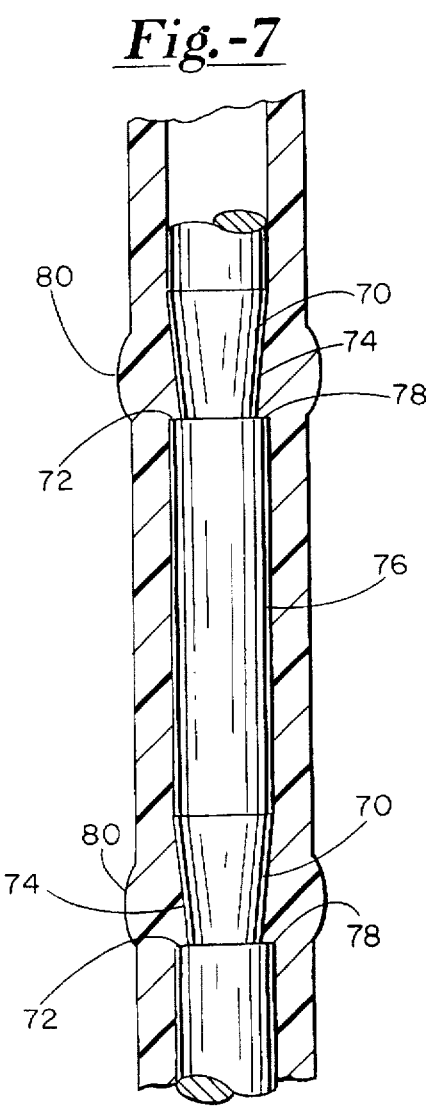

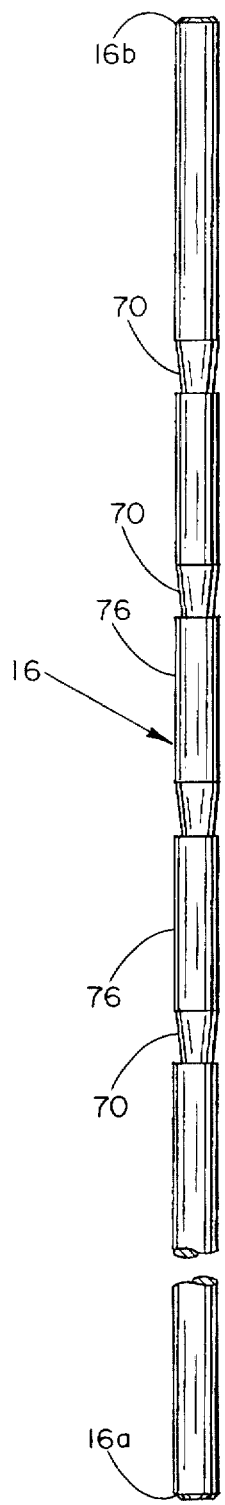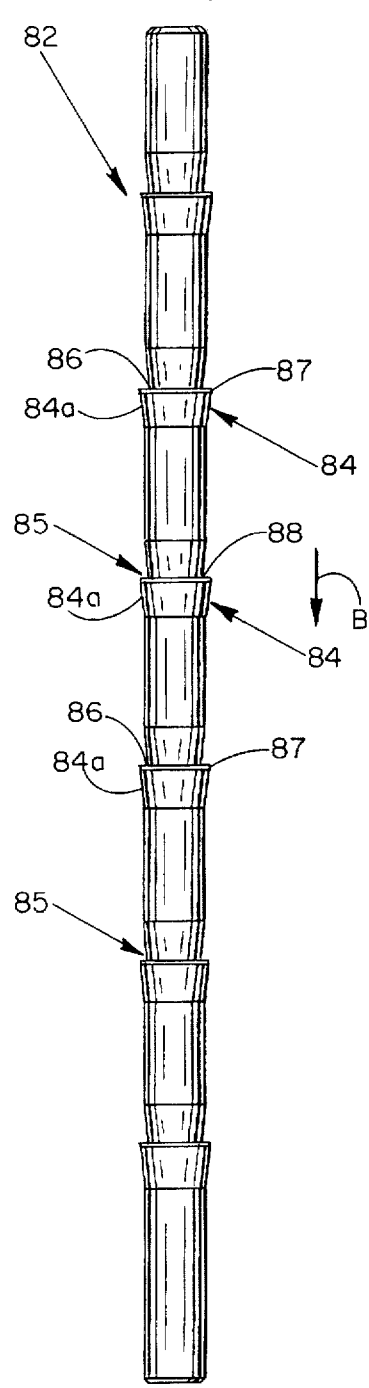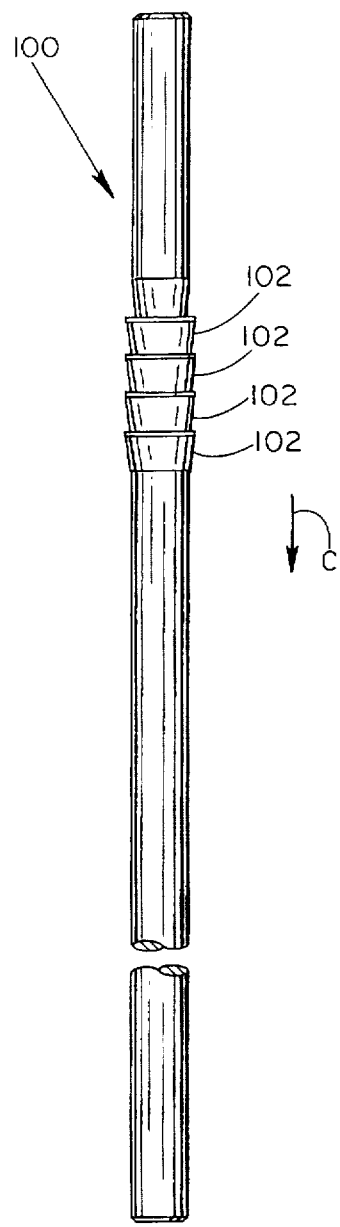

APPARATUS AND METHOD FOR PROVIDING LEAK PROOF SEALING BETWEEN A METAL ROD AND A PLASTIC HOUSING MOLDED THERE AROUND

FIELD OF THE INVENTION

The present invention relates generally to methods and apparatus for forming a plastic housing around an metal rod wherein such rod is, for example electrified, as in a liquid level sensing device, and in particular to such methods and apparatus wherein the rod forms a liquid and gas tight seal between itself and the plastic housing formed there around.

BACKGROUND OF THE INVENTION

It is well understood that molding plastic around a metal object can involve certain problems relating to the differing physical properties of the two substances, such as heat expansion and contraction, heat capacity, and so forth. These differences can be particularly challenging in the manufacture of, for example, liquid level sensing probes. Such probes are well known in the art, and can include a pair of electrically conductive rods at differing levels for detecting the level of a liquid within a closed container. Detection of the liquid level is generally accomplished by detecting electrical flow between the rods and the container as conducted by the liquid contained therein. The rods must then be electrically isolated from each other and from the container. This is usually done by molding the rods within a solid plastic housing. Due to the above stated differing physical properties of metal and plastic, it has long been recognized that the rods and the housing, upon cooling, will not always have formed a liquid or gas tight seal there between. This lack of binding between the two substances is primarily the result of the greater shrinkage of the plastic as it cools causing it to pull away and form gaps between itself the metal rod. Thus, water or gas can move along the rod in those gaps and can eventually flow out of the container. This problem is, of course, exacerbated in applications where the container interior is pressurized.

An example of a liquid level sensing probe used in a pressurized container is seen in carbonated drink dispensing machines where the water level in a pressurized carbonator tank must be continually monitored. Leakage of water and carbon dioxide gas in these applications can result in loss of pressure, corrosion of interior components of the machine and shorting of the sensing rods thereby causing reading errors.

Various strategies have been employed in the art to prevent this liquid and gas leakage. Attempts have been made to encapsulate the rods, or to use metal inserts within various compounds such as epoxy resins. One strategy has been to provide for a "tortured path" wherein the rod has a plurality of bends resulting in a "zigzag" structure as it extends through the plastic body from one end to the other thereof. However, such approaches have met with limited success as they do not address the fundamental problem of gap formation as the plastic cools. This strategy decreases somewhat the chance that a pathway from one end of the rod to the other will result, but does not serve to greatly minimize the problem. As a result, a liquid or gas will eventually flow along the length of any path regardless of how convoluted, if a continuous space exists between the rod and the plastic.

Another approach to minimize this leakage problem has been simply one involving the basics of plastic molding technique, such as selecting a plastic with minimal shrinkage characteristics and cooling the plastic at various rates. Unfortunately, the most desirable plastic from a shrinkage point of view may not be usable in the particular application, e.g. In a beverage dispenser application the plastic may not be food compatible. Regardless, these approaches also do not address the fundamental difference in shrinkage between the plastic and the metal.

Accordingly, it would be very desirable to have a method and apparatus for molding of plastic around a metal object, such as in the example of a liquid level sensor, where liquid and gas proof adhesion between the metal and plastic is provided for.

SUMMARY OF THE INVENTION

The present invention is an apparatus and method for providing liquid and gas proof sealing between a metal rod and a plastic housing molded there around. An example of an application of the present invention can be illustrated in the case of a liquid level sensing probe for use in determining the level of water in a carbonator of a beverage dispensing machine. A carbonator, as is known in the relevant art, comprises a sealed tank into which water and carbon dioxide gas are delivered under pressure so that carbonated water is formed therein. The carbonated water can then be dispensed therefrom to form a beverage, as is also well understood. Since the carbonated water is periodically withdrawn therefrom, water and carbon dioxide gas must be added to replace it so that more carbonated water can be formed. A liquid level sensing probe is then used to determine when to pump in more water.

The carbonator water level sensor has a rod housing body consisting of a solid plastic molded around a pair of level sensing rods. The housing body includes threads and an o-ring for providing sealable releasable engagement with a threaded hole in the carbonator tank. When so secured to the tank, the housing has a connection end extending exterior thereof for providing electrical connection of the rods to a control/electrical sensing means, and an interior portion extending there within. The rods consist of metal and extend out of the housing interior portion for contacting the water within the tank, and extend out of the housing connection end for facilitating the above mentioned connection to the control means. And each rod has one or more annular intrusions or protrusions comprising wedge means there around along the length thereof.

After molding of the housing around the rod, and after the plastic has cooled, the rods are both individually pushed further into the housing body in a direction from the housing exterior portion to the housing interior portion. In particular, each rod is pushed whereby the annular intrusions or protrusions thereof provide for a wedge-like sealing engagement between the rods and the surrounding plastic housing material. This cold flow sealing between each of the rod and the surrounding housing plastic material in the vicinity of each annular intrusion or protrusion provides for a plurality of fluid tight seals around the rods along the length thereof.

A further aspect of the present invention concerns a specific structure of the housing exterior portion. This exterior portion is formed to receive a plug for connecting the rods to the control/electrical sensing means. Moreover, the exterior portion is designed to minimize any liquid connection between the exterior probe ends that could occur as the result of condensation thereon and result in erratic operation thereof.

DESCRIPTION OF THE DRAWINGS

A further understanding of the structure, operation, and objects and advantages of the present invention can be had by referring to the following detailed description which refers to the following figures, wherein:

FIG. 1 shows a partial cross-sectional front plan view of the probe of the present invention.

FIG. 2 shows a front plan view of the sensor of the present invention secured to a carbonator tank subsequent to translation to the rods with respect to the plastic housing.

FIG. 3 shows a top plan view along lines 3—3 of FIG. 1.

FIG. 4 shows a partial cross-sectional view along lines 4—4 of FIG. 1.

FIG. 5 shows a cross-sectional view along lines 5—5 of FIG. 1.

FIG. 6 shows an enlarged cross-sectional view of a housing body and rod after molding but prior to translation of the rod with respect to the housing body.

FIG. 7 shows the housing and rod of FIG. 6 after translation of the rod with respect to the housing body.

FIG. 8 shows an embodiment of a rod of the present invention.

FIG. 9 shows an alternate embodiment of a rod of the present invention.

FIG. 10 shows an alternate embodiment of a rod of the present invention.

DETAILED DESCRIPTION

The method and apparatus of the present invention can be described in the context of liquid level sensor as used with a carbonator in a beverage dispensing machine. As is known in the art, a sensor of this type includes a structural or rod retaining portion that is physically secured to the carbonator tank and a generally remotely located electronic control portion electrically connected to the rod retaining portion. Such a rod retaining portion is seen in FIGS. 1 and 2 and is generally referred to by the numeral 10. Rod retaining portion 10 includes a molded plastic body 12 formed around a pair of metal rods 14 and 16 extending the length thereof. Rods 14 and 16 have liquid contacting ends 14a and 16a respectively and electrical connecting ends 14b and 16b respectively.

Body 12 includes a threaded portion 26 separating a head portion 28 from a lower portion 30. Head portion 28 includes a hexagonal flange 32 for facilitating the threaded engaging of sensor 10 with a carbonator 33. As is understood by those of skill, an o-ring 34 is used to provide for a water tight sealing engagement between sensor 10 and carbonator 33. As seen by also referring to FIGS. 3 and 4, head 28 includes a pair of plug receptacle sockets 36 and 38. Sockets 36 and 38 have interior perimeter surfaces 36a and 38a having different geometry's. The perimeter of each socket surface 36a and 38a is defined by an upwardly extending flange 40. A further pair of triangularly shaped flanges 42 and 44 are integral with and secured to flange 40 as well as to hex flange 32. As seen as referring to FIG. 4, socket flange 40 has a top surface 46, and also includes a return 48 extending therefrom adjacent top surface 46. As is understood by those of skill, sockets 36 and 38 are designed to receive a plug 50. In particular, plug 50 includes a pair of socket inserts 52 and 54 constructed to have an exterior surface geometry complementary to that of sockets 36 and 38 respectively to provide for specific insertion and cooperation with sockets 36 and 38. In this manner, the correct polarity connection of plug 50 with sensor 10 can be maintained. Sockets 52 and 54 provide for electrical connection between wires 56 and 58 and rod ends 14b and 16b respectively. Wires 56 and 58 then provide connection to and electronic control and power source, not shown. As is also understood by those of skill, a flexible arm 60 on plug 50 provides for releasable securing of plug 50 with head 28 by snap fitting interaction therewith with return 48.

The structure of rods 14 and 16 can be seen in greater detail in FIGS. 6 and 8. Each rod 14 and 16 is structurally identical except for being different overall lengths. This difference in length, as is known in the art, provides for the needed differential in liquid level sensing ability. The structure of rod 16, which will be understood to apply as well to rod 14, includes a plurality of frusto-conical surfaces 70 tapering to a shoulder 72. This creates a plurality of annular areas 74 around each surface 70. These annular areas can be understood as being the difference between the nominal or maximum diameter 76 of each rod 16 and the minimum diameters 78 seen at the intersection of the tapered end of each surface 70 and its corresponding shoulder 72, i.e., that portion of material of rod 16 that has been removed to create each surface 70. Such removal can be accomplished by turning the rod and grinding the material away. Each rod 14 and 16 is molded within body 12 wherein the plastic material of which during molding thereof flows around and contacts each of the surfaces 70 thereby "filling" the annular areas 74.

As stated, body 12 is manufactured by the molding of the plastic material thereof around rods 14 and 16. In particular, rods 14 and 16 are positioned so that after cooling of the plastic material, tip ends 14b and 16b are positioned to extend a short distance above surface 46, as seen in FIG. 1. Rods 14 and 16 are then further inserted into sensor body 10 wherein tip ends 14b and 16b are then positioned flush with top surface 46, as seen in FIG. 2. As a consequence thereof, tip ends 14a and 16a are necessarily extended further from body 12 as is indicated by the ghost outlines in FIG. 1, and as seen in FIG. 2. The reason for this further insertion after cooling of the plastic material around rods 14 and 16 can be had by referring to FIGS. 6 and 7. As seen therein, movement of rods 14 and 16 in the direction of Arrow A in FIG. 6 causes each frusto-conical surface 70 to act as a wedge pushing against the plastic material located immediately around it, and in particular, that material occupying grooves 74. Due to the angle of inclination thereof, each frusto-conical surface 70 acts as a wedge forcing tight contact between itself and that plastic material. As a result thereof, that is, after the linear translation of rods 14 and 16 with respect to the plastic material there around, a tight fit between each conical surface 70 and the plastic forming body 12 is positively established. It will be understood by those of skill that the elasticity of the plastic permits this "cold" flow of material. Also, as seen in FIG. 7, such movement can result in a slight outward bulging as indicated by numerals 80, however the presence or absence of such bulging is purely a matter of the thickness of the plastic material between the rods and the exterior surface of the plastic, i.e. such involves a matter of design choice. Thus, the method of the present invention provides for positively creating a tight contact between metal and plastic after the molding together thereof rather than simply attempting to rely on the plastic and metal initially forming a tight bond there between solely as a result of the molding process itself. It has been found that such post molding linear translation bonding process between metal and plastic is extremely effective in creating contact there between that is highly liquid and gas proof. In the example of sensor 10, water and carbon dioxide gas are prevented from flowing along the surfaces of rods 14 and 16 between those surfaces and body 12, even where the interior of carbonator tank 33 is pressurized. Thus, such water and gas can not find their way to rod ends 14b and 16b and ultimately out of tank 33. It can also be understood that the plurality of surfaces 70 along the length of each rod 14 and 16 provide for a multiplicity of solid areas of contact around the circumference of each rod, thereby providing a redundancy in such contact should any one annular are of contact fail.

Because water will not find its way to ends 14b and 16b the possibility of that water resulting in an electrical shorting contact there between, the problems associated therewith of inaccurate or faulty readings will be greatly reduced or eliminated. Such shorting contact can also arise from condensation on ends 14b and 16b. Such condensation occurs because carbonator 10 is generally cooled well below ambient temperatures and thereby cools sensor 10. Also sensor 10 will generally be positioned in an area of relatively high humidity. Thus, it can be seen that flanges 40, 42 and 44 are positioned and structured to interrupt the formation of a continuous liquid contact between rod ends 14b and 16b.

An alternate embodiment of a rod as used in the present invention can be seen in FIG. 9. As seen therein, a rod 82 includes a plurality of barbs 84, and corresponding narrowed waist areas 85. Each barb 84 has an annular conical surface 84a, and a shoulder surface 86 having outer perimeter edges 87 and an inner perimeter edge 88. The primary difference being that rod 82 is manufactured by roll forming thereof. Thus, pressure is applied at each waist area 88 displacing material that forms barbs 84. Embodiment 82 works in the same manner as that disclosed in rods 14 and 16 whereby translation of rod 82 in the direction of Arrow B in FIG. 9 provides for the surfaces 84a wedging against the plastic material formed there around.

A further rod embodiment is seen in FIG. 10 and referred to by the numeral 100. Rod 100 is also roll formed wherein the upset material forms a plurality of barbs 102 directly adjacent each other at one end of rod 100. In one embodiment of the present invention utilizing rod embodiment 100, the probe body plastic material is formed around rod 100 and barbs 102, after which rod 100 is then translated after cooling in the direction of arrow C. In a further embodiment, not shown, the plastic material is not formed around barbs 102, and after cooling of the plastic material, barbs 102 are all pulled therein.

It can be understood by those of skill that the essence of the present invention is to have an elongate piece of metal, such as a rod, that is to be sealed in a liquid and gas tight manner within a plastic body. This is accomplished with a plurality of annular intrusions or protrusions forming annular plastic displacing means around the circumference thereof that provide for a sealing contact between the sealing means and the surrounding plastic material that forms the housing. The sealing results from a post-cooling linear translation of the elongate rod with respect to the surrounding plastic material whereby the displacing means is forced into and moves the plastic material adjacent thereto resulting in a gas and liquid tights seal between the displacing means and the plastic material. Therefore, water or gas under pressure can not flow along the rod between it and the plastic material. The inclined plane portion of the rods serves to mechanically assist in the displacing of the plastic material in a manner that is conducive to forming a complete seal around the entire circumference of each annular displacing means. Those of skill will understand that the number of such displacing means within a housing will be a matter of design choice. And those of skill will also recognize that a wide variety of shapes of annular protrusions and/or intrusions along an elongate metal object can provide for such sealing whereby the intrusion or protrusion will cause movement of the plastic material and sealing there between as the result of relative motion between the two.. It can be further appreciated by those of skill that a wide variety of sizes and dimensions of the elongate metal objects such as rods 14,16 and 82 can be had. In a carbonator level sensing embodiment of the present invention, such rods can have a nominal diameter of 0.0935 inch where the difference between that diameter and the height or depth of an annular protrusion or intrusion respectively is on the order of 0.0085–0.0065 inch. In the application of a sensor such as sensor 10, rods 14 and 16 are inserted within body 12 approximately 3/16 inch after cooling of the plastic material. A wide variety of plastic materials are known and useful in various applications where molding around a metal object and sealing there between is required and would be applicable to the method and structure of the present invention. In the case of a liquid level sensor used in a carbonator of a beverage dispensing device, plastics such as polycarbonate, polyester or polyethylene are used.

I claim:

1. A liquid level sensing probe for sealable engagement with a container holding a liquid under pressure, comprising:

first and second rods each having one or more annular material displacing structures along a length thereof, a housing body made of a plastic material molded around the rods, one or more points of annular sealing engagement between the annular displacing structures and the plastic material of the housing resulting from linear translating of the first and second rods with respect to the housing resulting in a cold flow displacement of the plastic for forming the one or more points of annular sealing engagement, and where after the linear translating the first and second rods each have first probe ends extending from a housing first end, and the housing having a sealing structure for providing liquid tight sealing securing of the probe to the container wherein the first housing end is retained within the container.

2. The liquid level sensing probe as defined in claim 1, and the rods each having second ends extending adjacent an exterior surface of the plastic housing for permitting electrical connection thereto.

3. The liquid level sensing probe as defined in claim 2, and the plastic housing exterior surface for releasably receiving a plug for facilitating the electrical connection to the probe second ends and where the plug is releasably receivable in only one position.

4. The liquid level sensing probe as defined in claim 1, wherein the annular displacing structures each include annular groove portions.

5. The liquid level sensing probe as defined in claim 1, wherein the plastic material of the housing is electrically insulating.

6. The liquid level sensing probe as defined in claim 3, wherein the annular displacing structures each include annular groove portions.

7. The liquid level sensing probe as defined in claim 6, wherein the plastic material of the housing is electrically insulating.

8. A carbonated water level sensing probe for sealable engagement with a carbonator, comprising:

first and second rods each having one or more annular material displacing structures along a length thereof, a housing body made of an electrically insulating plastic material molded around the rods, one or more points of annular sealing engagement between the annular displacing structures and the plastic material of the housing resulting from linear translating of the first and second rods with respect to the housing resulting in a cold flow displacement of the plastic for forming the one or more points of annular sealing engagement, and where after the linear translating the first and second rods each have first probe ends extending from a housing first end and where the first and second rods each have a second end extending adjacent an exterior surface of the plastic housing for permitting connection thereto of an electrically operated conductivity sensor, and the plastic housing having a sealing structure for providing liquid and gas tight sealing securing of the probe to the carbonator wherein the first housing end is retained within the carbonator.

9. The liquid level sensing probe as defined in claim 8, and the plastic housing exterior surface for releasably receiving a plug for facilitating the connection to the conductivity sensor and where the plug is releasably receivable in only one position.

10. The liquid level sensing probe as defined in claim 8, wherein the annular displacing structures each include annular groove portions.

11. The liquid level sensing probe as defined in claim 9, wherein the annular displacing structures each include annular groove portions.

* * * * *